(12) United States Patent
Pan et al.

(10) Patent No.: US 8,480,287 B2
(45) Date of Patent: Jul. 9, 2013

(54) LIGHT SOURCE MODULE

(75) Inventors: Bo-Chih Pan, Hsin-Chu (TW); Fan-Ti Cho, Hsin-Chu (TW); Yu-Wei Liang, Hsin-Chu (TW); Hsi-Sheng Chang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 347 days.

(21) Appl. No.: 12/903,214

(22) Filed: Oct. 13, 2010

(65) Prior Publication Data

US 2011/0286241 A1 Nov. 24, 2011

(30) Foreign Application Priority Data

May 18, 2010 (CN) .......................... 2010 1 0184461

(51) Int. Cl.
*F21V 7/04* (2006.01)
(52) U.S. Cl.
USPC ........... 362/632; 362/633; 362/634; 362/97.1
(58) Field of Classification Search
USPC ................. 362/600–634, 97.1–97.4
See application file for complete search history.

(56) References Cited

U.S. PATENT DOCUMENTS

| 6,811,276 | B2 | 11/2004 | Moon |
| 7,452,121 | B2 | 11/2008 | Cho et al. |
| 2007/0159832 | A1* | 7/2007 | Kim et al. ..................... 362/331 |
| 2008/0225202 | A1* | 9/2008 | Joo et al. ....................... 362/339 |
| 2010/0066937 | A1* | 3/2010 | Yamashita et al. ............. 349/58 |

FOREIGN PATENT DOCUMENTS

| CN | 1613026 | 5/2005 |
| CN | 101470481 | 7/2009 |
| CN | 101520574 | 9/2009 |
| CN | 101676769 | 3/2010 |
| JP | 2003-330377 | 11/2003 |
| TW | M332864 | 5/2008 |

OTHER PUBLICATIONS

"Office Action of China Counterpart Application" with English translation thereof, issued on Aug. 31, 2012, p. 1-p. 17.
"Second Office Action of China Counterpart Application" with English translation thereof, issued on Apr. 18, 2013, p1-p19, in which the listed references were cited.

* cited by examiner

*Primary Examiner* — William Carter
(74) *Attorney, Agent, or Firm* — Jianq Chyun IP Office

(57) ABSTRACT

A light source module including a back frame, a light guide plate (LGP), and at least one light emitting device is provided. The back frame has a baseboard. The LGP is disposed on the back frame, and has a first surface, a second surface opposite to the first surface, and a light incident surface, wherein the second surface faces toward the baseboard. The light emitting device is disposed beside the light incident surface. The light source module further includes a thermal insulating element, which is disposed between the baseboard and the second surface, and is located adjacent to the light incident surface.

20 Claims, 9 Drawing Sheets

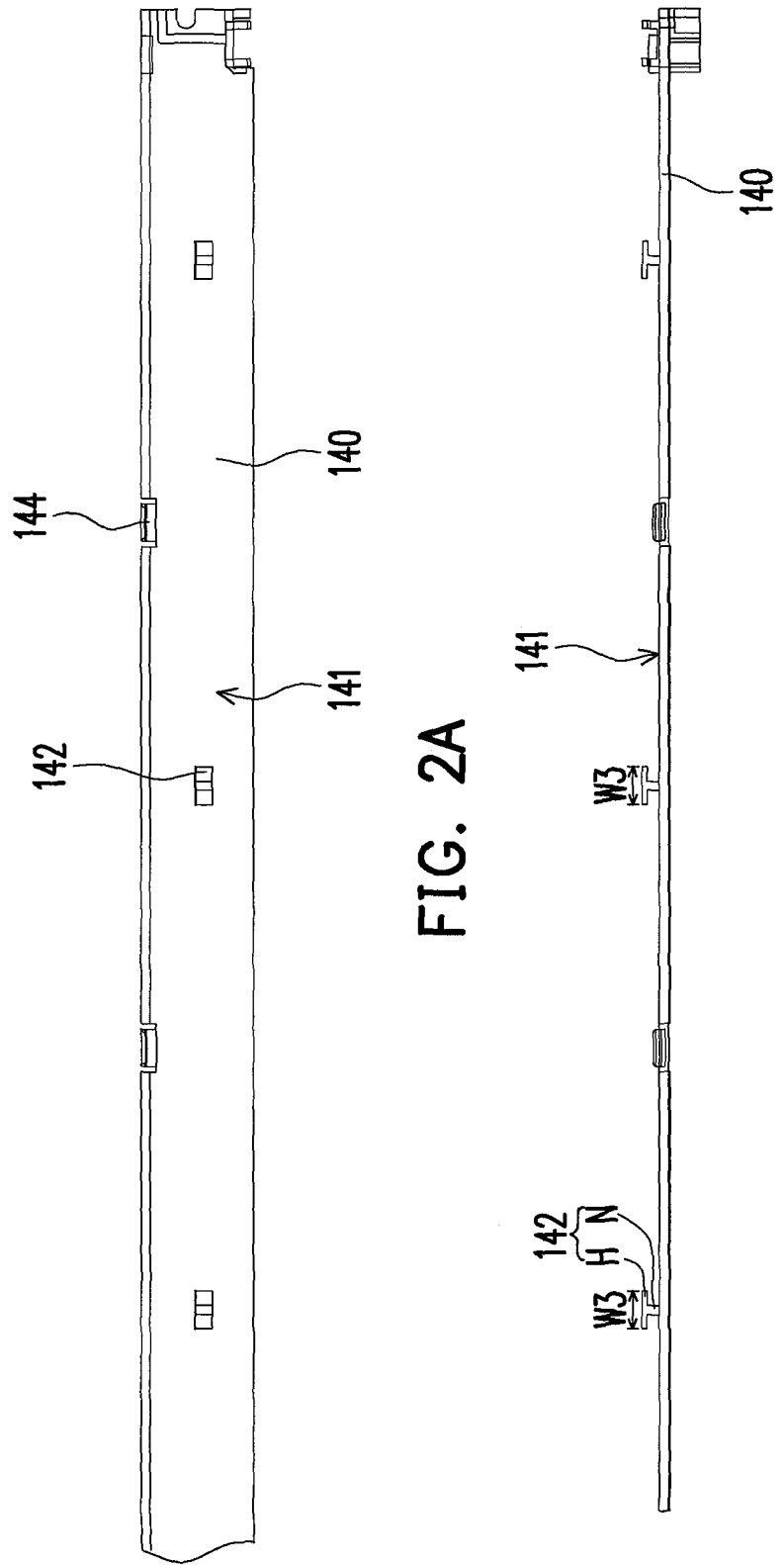

LIGHT SOURCE MODULE

CROSS-REFERENCE TO RELATED APPLICATION

This application claims the priority benefit of China application serial no. 201010184461.0, filed on May 18, 2010. The entirety of the above-mentioned patent application is hereby incorporated by reference herein and made a part of this specification.

BACKGROUND

1. Field of the Invention

The invention relates to a light source module. More particularly, the invention relates to a light source module having a thermal insulating element.

2. Description of Related Art

In a conventional side type light source module, a light guide plate (LGP) is used to guide a light beam emitted by a light emitting device disposed at a side of the LGP to a front side of the LGP, so as to form a surface light source. Generally, after the light beam emitted by the light emitting device enters the LGP from a side surface of the LGP, the light beam is continuously and totally reflected between an upper surface and a lower surface of the LGP, so that the light beam is confined within the LGP. However, a plurality of microstructures disposed on the lower surface of the LGP may spoil the total reflection, so that the light beam may be incident to the upper surface with an incident angle smaller than the critical angle, and may penetrate the upper surface.

In a liquid crystal display (LCD), since a liquid crystal panel does not emit light itself, the side type light source module is generally used as a backlight module to illuminate the liquid crystal panel. The side type light source module is especially suitable for the LCD having a small size.

Since a light emitting diode (LED) has advantages of low power consumption, environmental protection, long service life, etc., it is generally used as the light emitting device in the side type light source module of the LCD. However, after a long time operation, the heat generated by the LED may cause a problem of reliability. For example, the heat generated by the LED is generally transmitted to one end of the LGP around the light incident surface through a back frame, so that the LGP may be deformed due to the heat. Therefore, uniformity of the surface light source provided by the light source module is influenced, which may cause a poor display quality of the LCD.

SUMMARY

The invention is directed to a light source module having better reliability and optical quality.

Additional aspects and advantages of the invention will be set forth in the description of the techniques disclosed in the invention.

To achieve one of or all aforementioned and other advantages, an embodiment of the invention provides a light source module including a back frame, a light guide plate (LGP), and at least one light emitting device. The back frame has a baseboard. The LGP is disposed on the back frame, and has a first surface, a second surface opposite to the first surface, and a light incident surface connected to the first surface and the second surface, wherein the second surface faces toward the baseboard. The light emitting device is disposed beside the light incident surface. The light source module further includes a thermal insulating element. The thermal insulating element is disposed between the baseboard and the second surface, and is located adjacent to the light incident surface.

The embodiment of the invention may have at least one of the following advantages or effects. Since the light source module according to the embodiment of the invention has the thermal insulating element, the heat transmitted to the back frame from the light emitting device is isolated by the thermal insulating element, so that the heat may not be directly transmitted to a part of the LGP adjacent to the light incident surface to cause a deformation of the LGP. Therefore, the light source module according to the embodiment of the invention may have a better reliability, and influencing of an optical quality of the light source module due to a long time utilization of the light source module may be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a bottom view of a thermal insulating element of FIG. 1A.

FIG. 2B is a side view of a thermal insulating element of FIG. 1A.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
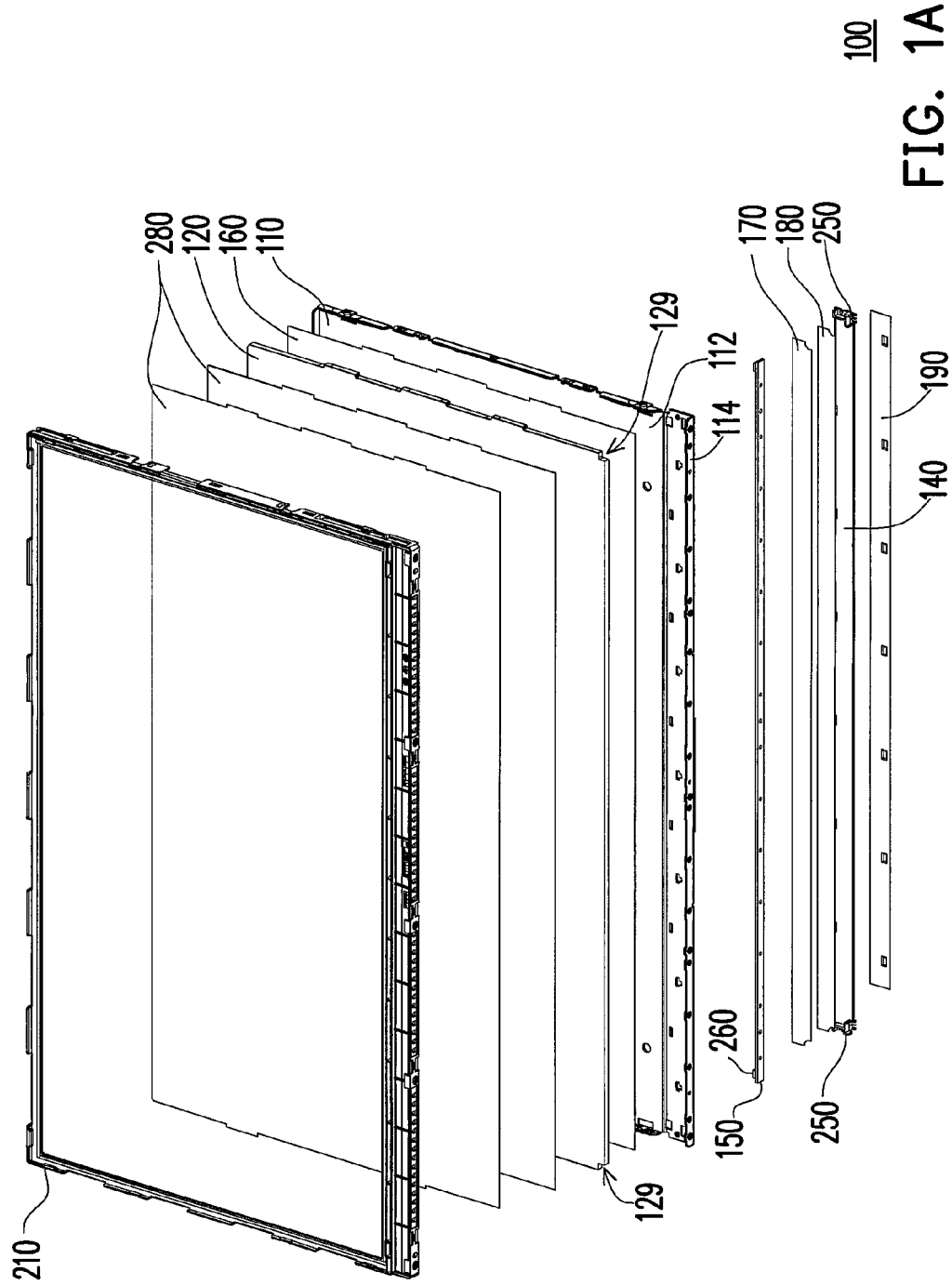
FIG. 1A is a schematic view of a light source module according to an embodiment of the invention.
Figure 1B:
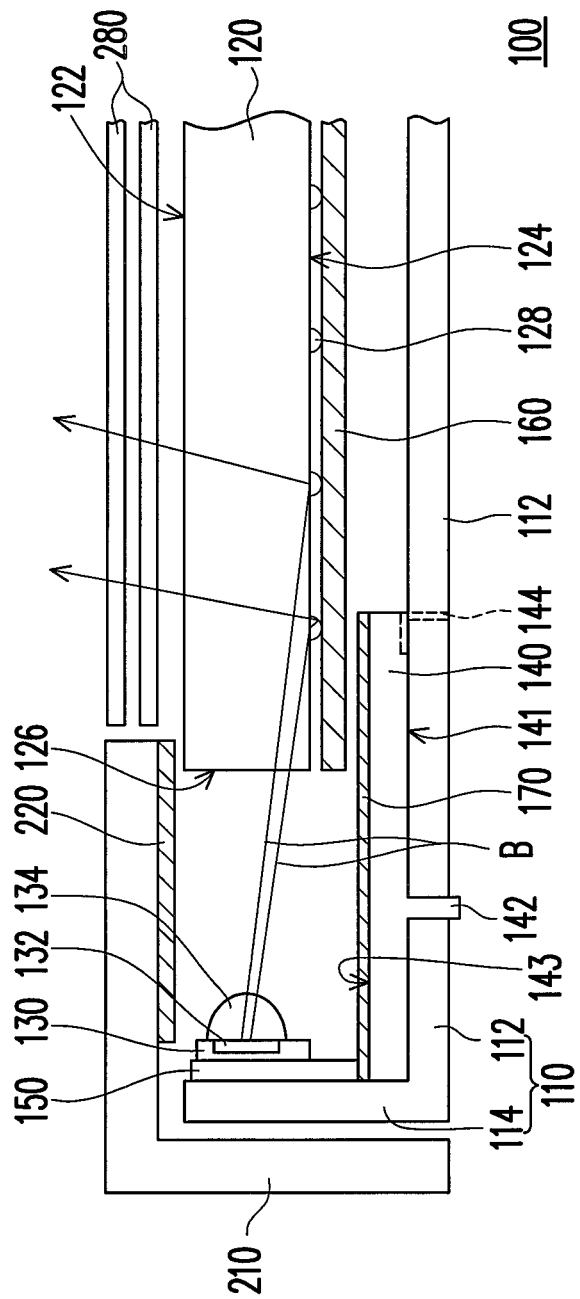
FIG. 1B is a partial cross-sectional view of a light source module of FIG. 1A.
Figure 1C:
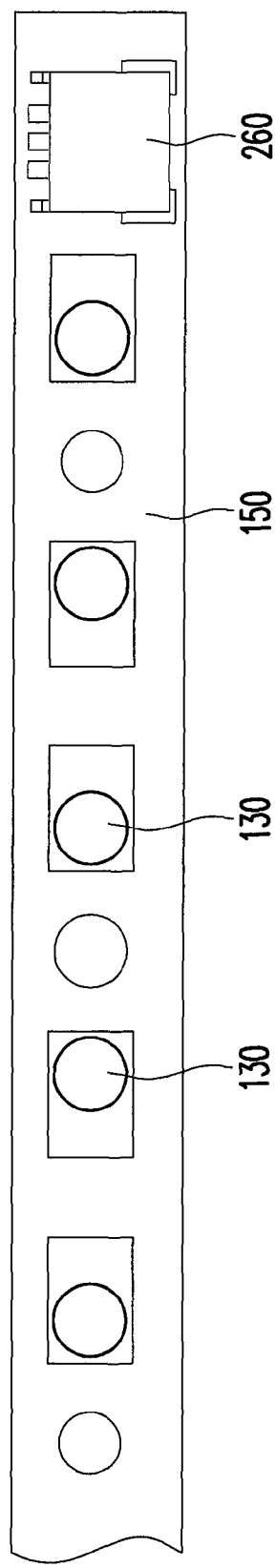
FIG. 1C is a partial front view of a light emitting bar of FIG. 1A.

FIG. 1A is a schematic view of a light source module according to an embodiment of the invention, FIG. 1B is a partial cross-sectional view of the light source module of FIG. 1A, and FIG. 1C is a partial front view of a light emitting bar of FIG. 1A. Referring to FIGS. 1A to 1C, the light source module 100 of the present embodiment may be used as a backlight module of a liquid crystal display (LCD), or used as a general lighting device. The light source module 100 of the present embodiment includes a back frame 110, a light guide plate (LGP) 120, at least one light emitting device 130 (in FIG. 1C, a plurality of light emitting devices 130 is illustrated), and a thermal insulating element 140.

The back frame 110 has a baseboard 112. The LGP 120 is disposed on the back frame 110, and has a first surface 122, a second surface 124 opposite to the first surface 122, and a light incident surface 126 connected to the first surface 122 and the second surface 124, wherein the second surface 124 faces toward the baseboard 112. Moreover, the light emitting device 130 is disposed beside the light incident surface 126. In the present embodiment, the back frame 110 further includes a sideboard 114. The sideboard 114 is connected to the baseboard 112, the light incident surface 126 faces toward the sideboard 114, and the light emitting device 130 is disposed on the sideboard 114. Moreover, in the present embodiment, a plurality of the light emitting devices 130 are disposed on a circuit board 150 to form a light emitting bar. In the present embodiment, the light emitting device 130 is a light emitting diode (LED), for example, a top emitting type LED. To be specific, the top emitting type LED includes an LED chip 132 and a spherical lens 134, wherein the spherical lens 134 covers the LED chip 132. The LED chip 132 is used for emitting a light beam B. After the light beam B passes through the spherical lens 134, the light beam B enters the LGP 120 through the light incident surface 126. The first surface 122 and the second surface 124 continuously and totally reflect the light beam B for confining the light beam B within the LGP 120. The second surface 124 of the LGP 120 may have a plurality of light-scattering microstructures 128, and the light-scattering microstructures 128 are used to spoil the above total reflection for scattering the light beam B to the first surface 122, so that the light beam B may emit out of the LGP 120 through the first surface 122. Moreover, the light-scattering microstructures 128 may also scatter the light beam B to a reflector 160 disposed between the second surface 124 and the baseboard 112. The reflector 160 reflects the light beam B back to the LGP 120, so that the light beam B may sequentially pass through the second surface 124 and the first surface 122. In the present embodiment, the light-scattering microstructures 128 are formed on the second surface 124 of the LGP 120 through injection molding, inkjet, screen printing or other etching methods. In the present embodiment, the reflector 160 is, for example, a white reflector. In another embodiment, the reflector 160 may simultaneously have a reflection function and a diffusion function, so as to reflect the light beam B in a diffusion approach.

The thermal insulating element 140 is disposed between the baseboard 112 and the second surface 124, and is located adjacent to the light incident surface 126. In the present embodiment, the thermal insulating element 140 is disposed on the baseboard 112 and extends from a place adjacent to the LGP 120 toward a place adjacent to the light emitting device 130. In the present embodiment, a heat conduction coefficient of the thermal insulating element 140 is smaller than that of the back frame 110. In the present embodiment, the heat conduction coefficient of the thermal insulating element 140 is substantially smaller than 1 W/mK, i.e. the thermal insulating element 140 has a certain degree of a thermal insulating effect. For example, a material of the thermal insulating element 140 is, for example, plastic, and a material of the back frame 110 is metal, for example, aluminium. A heat conduction coefficient of the plastic is lower than that of the metal, so that the plastic has the thermal insulating effect. In the present embodiment, the thermal insulating element 140 may further has a reflection function for reflecting the light beam B.

Since the light source module 100 of the present embodiment has the thermal insulating element 140, after the heat generated by the light emitting device 130 is transmitted to the baseboard 112 through the sideboard 114, the heat is isolated by the thermal insulating element 140, and may not be directly transmitted to a part of the LGP 120 adjacent to the light incident surface 126 to cause a deformation of the LGP 120. Therefore, the light source module 100 of the present embodiment may have a better reliability. Moreover, after a long time utilization of the light source module 100, the LGP 120 is not liable to be deformed due to the heat, so as to avoid influencing an optical quality of the light source module 100. For example, since the LGP 120 is not liable to be deformed due to the heat, the light source module 100 may provide a uniform and stable surface light source.

In the present embodiment, the light source module 100 further includes a reflection unit 170 disposed on the thermal insulating element 140, wherein the thermal insulating element 140 is located between the reflection unit 170 and the baseboard 112. In the present embodiment, the reflection unit 170 is, for example, a silver reflector, and is used for reflecting the light beam B. Moreover, in the present embodiment, the reflection unit 170 may be adhered to the thermal insulating element 140 through a double-side adhesive tape 180. Moreover, the thermal insulating element 140 may also be adhered to the baseboard 112 through a double-side adhesive tape 190. In addition, in the present embodiment, one end of the reflector 160 that is located adjacent to the light incident surface 126 is located between the second surface 124 and one end of the reflection unit 170.

In the present embodiment, the light source module 100 further includes a front frame 210 and a reflection unit 220. The front frame 210 covers the light emitting device 130, and the light emitting device 130 is located between the front frame 210 and the baseboard 112. In the present embodiment, the front frame 210 also covers one end of the LGP 120 around the light incident surface 126. The reflection unit 220 is disposed on the front frame 210, and is located between the front frame 210 and the thermal insulating element 140. In the present embodiment, the reflection unit 220 is, for example, a silver reflector.

In the present embodiment, since the LED 130 uses the spherical lens 134 to converge the light beam B, a distance L between the LED 130 and the light incident surface 126 may be relatively long, which is substantially within a range of greater than or equal to 6 millimeters and less than or equal to 7 millimeters, for example.

Figure 2C:
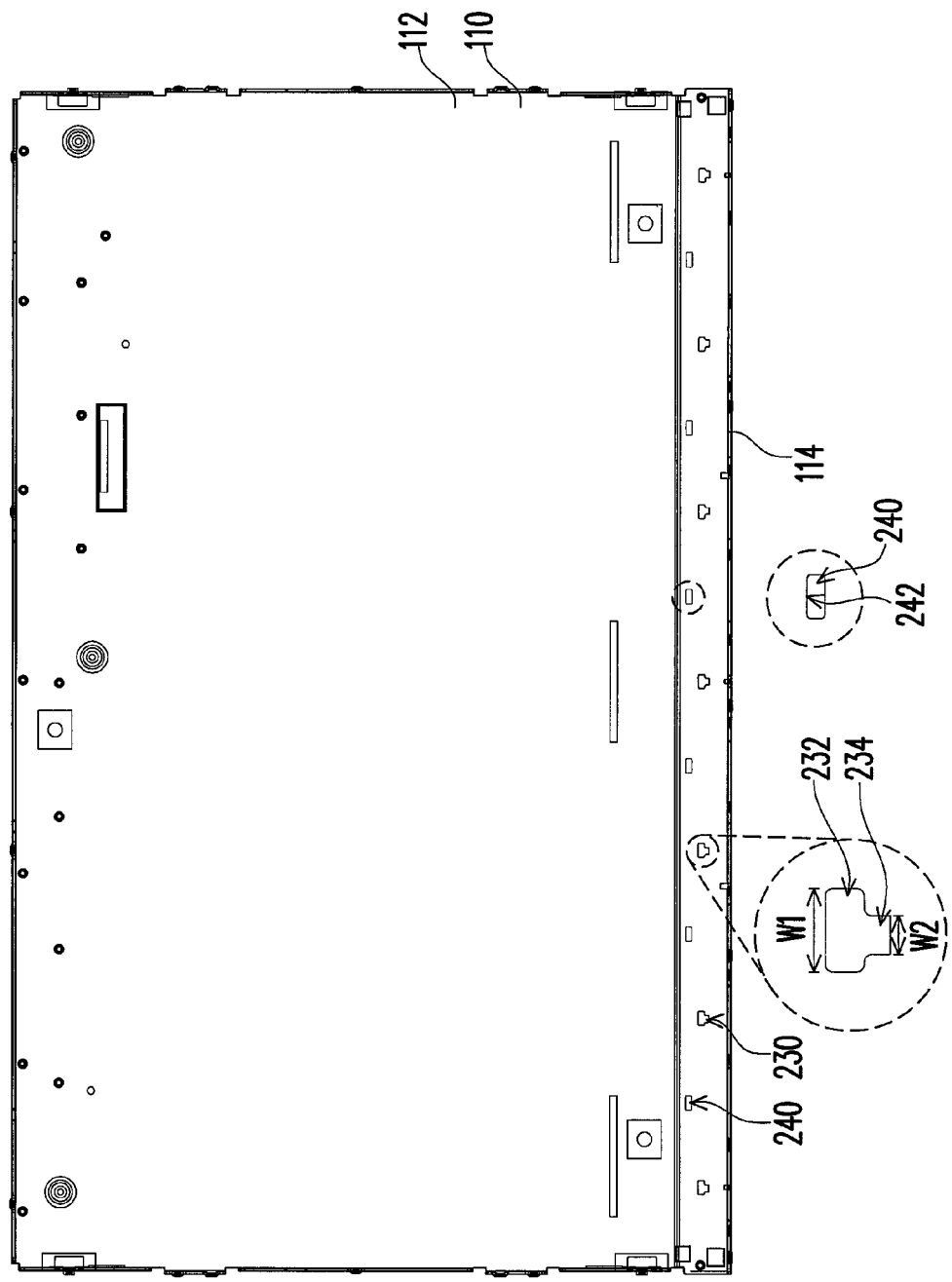
FIG. 2C is a top view of a back frame of FIG. 1A.
Figure 3A:
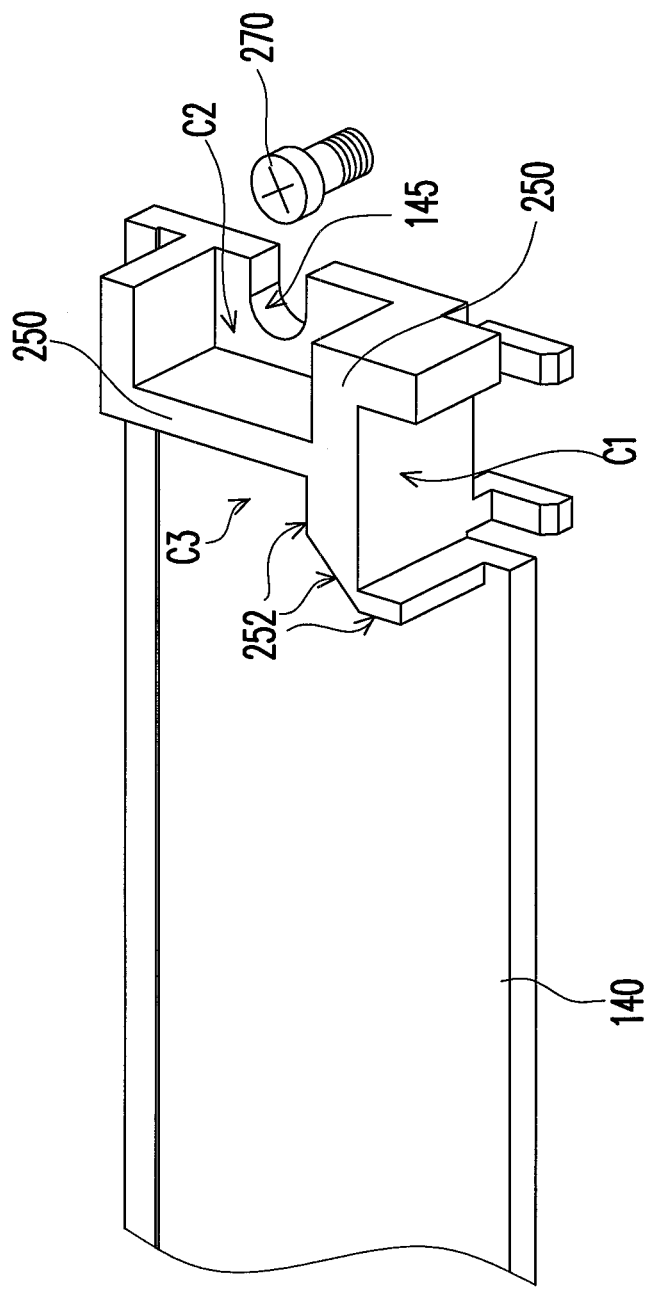
FIG. 3A is a three-dimensional view of one end of a thermal insulating element of FIG. 1A.
Figure 3B:
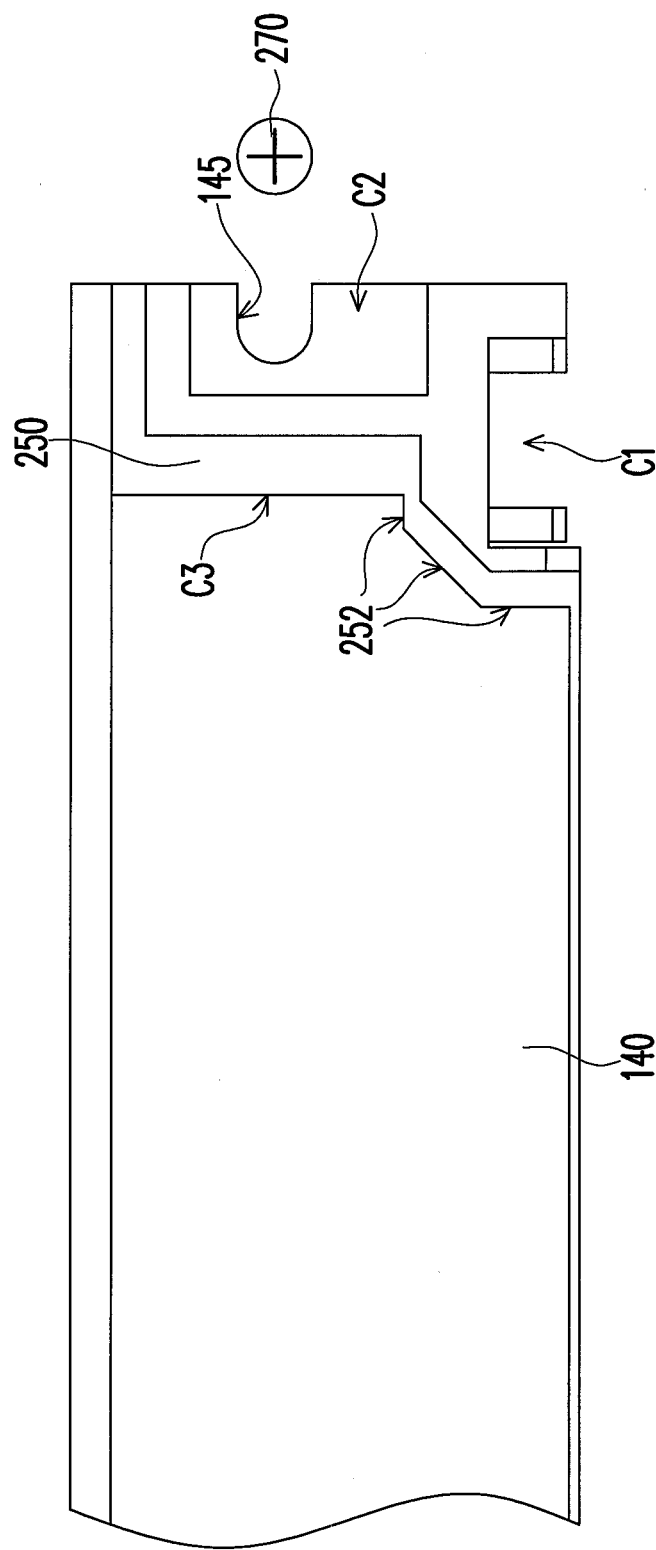
FIG. 3B is a top view of one end of a thermal insulating element of FIG. 1A.

FIG. 2A is a bottom view of the thermal insulating element of FIG. 1A, FIG. 2B is a side view of the thermal insulating element of FIG. 1A, FIG. 2C is a top view of the back frame of FIG. 1A, FIG. 3A is a three-dimensional view of one end of the thermal insulating element of FIG. 1A, and FIG. 3B is a top view of one end of the thermal insulating element of FIG. 1A. Referring to FIG. 1B and FIGS. 2A to 2C, in the present embodiment, the thermal insulating element 140 has a plurality of T-shaped hooks and a plurality of stop blocks 144. The T-shaped hook 142 is disposed on a surface 141 of the thermal insulating element 140 that faces the baseboard 112, and includes a neck portion N and a hook head H connected to the neck portion N. The stop block 144 is disposed on one end of the thermal insulating element 140 that is located between the baseboard 112 and the second surface 124, wherein the stop block 144 is bended toward a direction apart from the second surface 124. Moreover, the baseboard 112 has a plurality of T-shaped through holes 230 and a plurality of through holes 240. Each of the T-shaped through hole 230 includes a wide hole 232 and a narrow hole 234. A width W1 of the wide hole 232 is capable of letting the hook head H of the T-shaped hook 142 pass through. The narrow hole 234 is connected to one side of the wide hole 232, wherein a width W2 of the narrow hole 234 is smaller than the width W1 of the wide hole 232. The neck portion N passes through the narrow hole 234, a width W3 of the hook head H is greater than the width W2 of the narrow hole 234, and the hook head H hooks edges of the narrow hole 234. Moreover, the stop blocks 144 respectively lean against sidewalls 242 of the through holes 240. In detail, when the thermal insulating element 140 is about to be assembled onto the baseboard 112, the hook head H is first manipulated to pass through the wide hole 232. Then, the neck portion N is pushed form the wide hole 232 to the narrow hole 234, and now the stop block 144 naturally enters the through hole 240 for leaning against the sidewall 242 of the through hole 240.

Referring to FIG. 1A, FIG. 1B, FIG. 3A, and FIG. 3B, in the present embodiment, the thermal insulating element 140 has at least one protrusion spacing part 250, which is disposed on a surface 143 of the thermal insulating element 140 that is opposite to the baseboard 112, and is located at one end of the thermal insulating element 140. In FIG. 1A, it is taken as an example that two protrusion spacing parts 250 are respectively located at two ends of the thermal insulating element 140. In FIG. 3A, the protrusion spacing part 250 spaces one side of the thermal insulating element 140 that is opposite to the baseboard 112 into a first containing space C1, a second containing space C2, and a third containing space C3. Referring to FIG. 1A, FIG. 1B, FIG. 3A, and FIG. 3B again, the light source module 100 further includes at least one electric connector 260 and at least one securing member 270. The electric connector 260 is electrically connected to the light emitting device 130, and is disposed in the first containing space C1, wherein the electric connector 260 is used for electrically connecting an external power supply. In the present embodiment, the electric connector 260 is, for example, electrically connected to the light emitting device 130 through the circuit board 150. The securing member 270 is disposed in the second containing space C2, and is used for securing the thermal insulating element 140 onto the baseboard 112. In the present embodiment, the securing member 270 passes through a notch 145 of the thermal insulating element 140 to secure the thermal insulating element 140 onto the baseboard 112. Moreover, the LGP 120 has at least one recessed corner 129, and the recessed corner 129 is located at a corner of the LGP 120 and is disposed in the third containing space C3, wherein the recessed corner 129 leans against one side of the protrusion spacing part 250, for example, leans against a bending surface 252 of the protrusion spacing part 250.

In the present embodiment, the light source module 100 further includes an optical film set 280 disposed on the first surface 122, wherein the optical film set 280 includes at least one of a prism film, a brightness enhancement film, a diffuser and other optical films.

Figure 4:
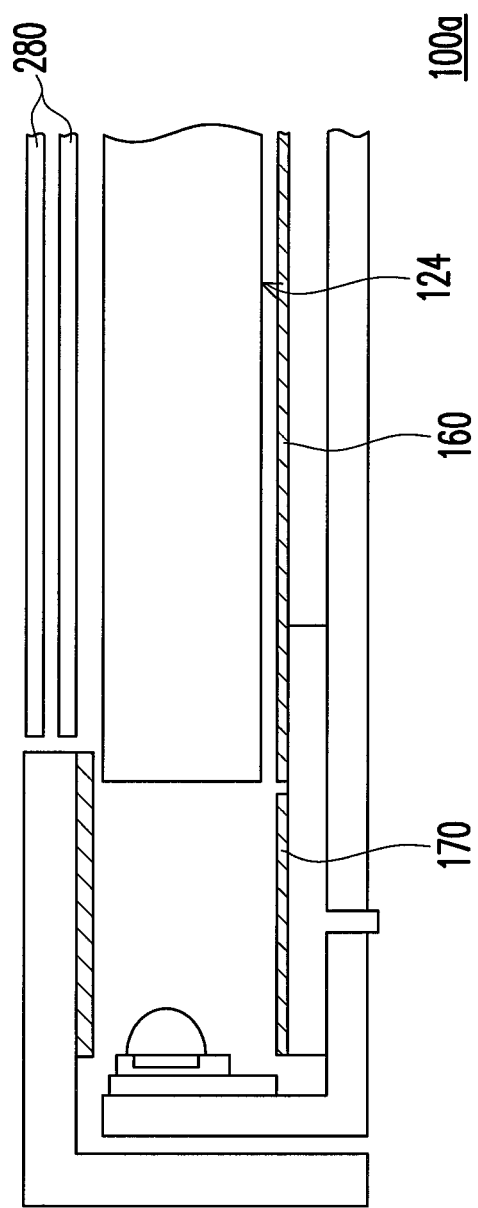
FIG. 4 is a partial cross-sectional view of a light source module according to another embodiment of the invention.

FIG. 4 is a partial cross-sectional view of a light source module according to another embodiment of the invention. Referring to FIG. 4, the light source module 100a of the present embodiment is similar to the light source module 100 of FIG. 1B, and differences therebetween are described as follows. In the light source module 100 of FIG. 1B, the reflector 160 and the reflection unit 170 are partially overlapped. However, in the light source module 100a of the present embodiment, the reflector 160 and the reflection unit 170 are separated, i.e. the reflector 160 and the reflection unit 170 are not overlapped. In detail, in the present embodiment, the reflector 160 and the reflection unit 170 of the light source module 100a are separated and are not overlapped in a direction substantially perpendicular to the second surface 124, and the reflector 160 and the reflection unit 170 are horizontally arranged along a direction substantially parallel to the second surface 124.

Figure 5:
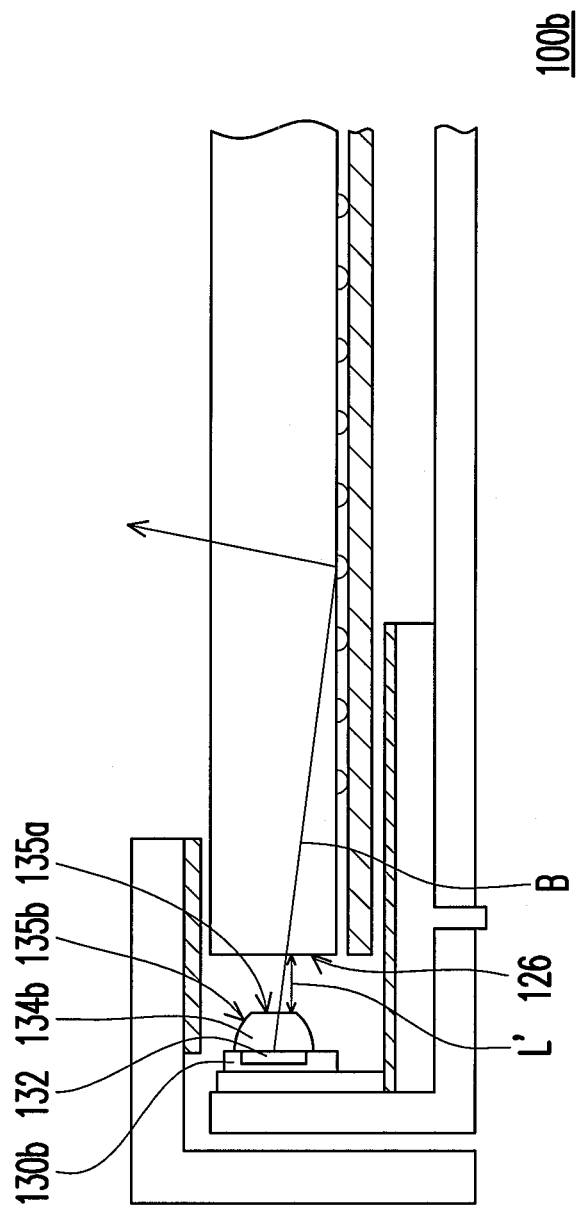
FIG. 5 is a partial cross-sectional view of a light source module according to still another embodiment of the invention.

FIG. 5 is a partial cross-sectional view of a light source module according to still another embodiment of the invention. Referring to FIG. 5, the light source module 100b of the present embodiment is similar to the light source module 100 of FIG. 1B, and differences therebetween are described as follows. In the light source module 100b of the present embodiment, a light emitting device 130b may use an aspheric lens 134b. Compared to the spherical lens 134 of FIG. 1B, the aspheric lens 134b may diverge the light beam B, so that a distance L' between the light emitting device 130b and the light incident surface 126 is relatively short. In detail, in the present embodiment, the aspheric lens 134b has a plane 135a and a curved surface 135b connected to the plane 135a. However, in other embodiments, the aspheric lens may also be any lens having a surface that is not a spherical surface and has a refraction effect for the light beam.

In summary, the embodiment of the invention may have at least one of the following advantages or effects. Since the light source module according to the embodiments of the invention has the thermal insulating element, the heat transmitted to the back frame from the light emitting device is isolated by the thermal insulating element, so that the heat may not be directly transmitted to a part of the LGP adjacent to the light incident surface to cause a deformation of the LGP. Therefore, the light source module according to the embodiments of the invention may have a better reliability, and influencing of an optical quality of the light source module due to a long time utilization of the light source module may be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
   a back frame, having a baseboard;
   a light guide plate, disposed on the back frame, and having a first surface, a second surface opposite to the first surface, and a light incident surface connected to the first surface and the second surface, wherein the second surface faces toward the baseboard; and
   at least one light emitting device, disposed beside the light incident surface;
   wherein the light source module further comprises a thermal insulating element, disposed between the baseboard and the second surface, and located adjacent to the light incident surface, wherein the thermal insulating element comprises:
      a plurality of T-shaped hooks, disposed on a surface of the thermal insulating element facing the baseboard, and comprising a neck portion and a hook head connected to the neck portion; and
      a plurality of stop blocks, disposed on one end of the thermal insulating element located between the baseboard and the second surface, wherein the stop block is bended toward a direction apart from the second surface, and
   the baseboard comprises:
      a plurality of T-shaped through holes, and each of the T-shaped through hole comprising:
         a wide hole, wherein a width of the wide hole is capable of letting the hook head of the T-shaped hook pass through; and
         a narrow hole, connected to one side of the wide hole, wherein a width of the narrow hole is smaller than the width of the wide hole, the neck portion passes through the narrow hole, a width of the hook head is greater than the width of the narrow hole, and the hook head hooks an edge of the narrow hole; and
      a plurality of through holes, wherein the stop blocks are respectively leaned against sidewalls of the through holes.

2. The light source module as claimed in claim 1, wherein the thermal insulating element is disposed on the baseboard and extends from a place adjacent to the light guide plate toward a place adjacent to the light emitting device.

3. The light source module as claimed in claim 1, wherein the back frame further comprises a sideboard, wherein the sideboard is connected to the baseboard, the light incident surface faces toward the sideboard, and the light emitting device is disposed on the sideboard.

4. The light source module as claimed in claim 1, further comprising a reflection unit, wherein the reflection unit is disposed on the thermal insulating element, and the thermal insulating element is located between the reflection unit and the baseboard.

5. The light source module as claimed in claim 4, further comprising a reflector disposed between the second surface and the baseboard, wherein one end of the reflector adjacent to the light incident surface is located between the second surface and one end of the reflection unit.

6. The light source module as claimed in claim 5, wherein the reflector and the reflection unit are partially overlapped.

7. The light source module as claimed in claim 5, wherein the reflector and the reflection unit are separated and are not overlapped.

8. The light source module as claimed in claim 7, wherein the reflector and the reflection unit are separated and are not overlapped in a direction substantially perpendicular to the second surface, and the reflector and the reflection unit are horizontally arranged along a direction substantially parallel to the second surface.

9. The light source module as claimed in claim 4, wherein the reflection unit is a silver reflector.

10. The light source module as claimed in claim 1, further comprising:
    a front frame, covering the light emitting device, wherein the light emitting device is located between the front frame and the baseboard; and
    a reflection unit, disposed on the front frame, and located between the front frame and the thermal insulating element.

11. The light source module as claimed in claim 1, further comprising a reflector disposed between the second surface and the baseboard.

12. The light source module as claimed in claim 1, wherein the light emitting device is a light emitting diode.

13. The light source module as claimed in claim 12, the light emitting diode is a top emitting type light emitting diode.

14. The light source module as claimed in claim 13, wherein the top emitting type light emitting diode comprises:
    a light emitting diode chip; and
    a spherical lens, covering the light emitting diode chip.

15. The light source module as claimed in claim 13, wherein the top emitting type light emitting diode comprises:
    a light emitting diode chip; and
    an aspheric lens, covering the light emitting diode chip.

16. The light source module as claimed in claim 14, wherein a distance between the light emitting device and the light incident surface is substantially within a range of greater than or equal to 6 millimeters and less than or equal to 7 millimeters.

17. The light source module as claimed in claim 1, wherein a heat conduction coefficient of the thermal insulating element is substantially smaller than 1 W/mK.

18. The light source module as claimed in claim 1, wherein a heat conduction coefficient of the thermal insulating element is smaller than a heat conduction coefficient of the back frame.

19. The light source module as claimed in claim 18, wherein a material of the thermal insulating element is plastic, and a material of the back frame is metal.

20. A light source module, comprising:
a back frame, having a baseboard;
a light guide plate, disposed on the back frame, and having a first surface, a second surface opposite to the first surface, and a light incident surface connected to the first surface and the second surface, wherein the second surface faces toward the baseboard; and
at least one light emitting device, disposed beside the light incident surface;
wherein the light source module further comprises a thermal insulating element, disposed between the baseboard and the second surface, and located adjacent to the light incident surface,
wherein the thermal insulating element has at least one protrusion spacing part, and the protrusion spacing part is disposed on a surface of the thermal insulating element opposite to the baseboard, and is located at one end of the thermal insulating element, wherein the protrusion spacing part spaces one side of the thermal insulating element opposite to the baseboard into a first containing space, a second containing space, and a third containing space, and the light source module further comprises:
at least one electric connector, electrically connected to the light emitting device, and disposed in the first containing space; and
at least one securing member, disposed in the second containing space, for securing the thermal insulating element onto the baseboard,
wherein the light guide plate has at least one recessed corner, located at a corner of the light guide plate and disposed in the third containing space, wherein the recessed corner leans against one side of the protrusion spacing part.

* * * * *